US010242859B2

(12) United States Patent
Kim et al.

(10) Patent No.: US 10,242,859 B2
(45) Date of Patent: Mar. 26, 2019

(54) MEMS-BASED 3D ION TRAPPING DEVICE FOR USING LASER PENETRATING ION TRAPPING STRUCTURE, AND METHOD FOR MANUFACTURING SAME

(71) Applicant: ID Quantique SA., Genève (CH)

(72) Inventors: Taehyun Kim, Seoul (KR); Dongil Cho, Seoul (KR); Minjae Lee, Seoul (KR); Seokjun Hong, Seoul (KR); Hongjin Cheon, Seoul (KR)

(73) Assignees: ID QUANTIQUE, Genève (CH); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/490,250

(22) Filed: Apr. 18, 2017

(65) Prior Publication Data
US 2017/0221693 A1  Aug. 3, 2017

Related U.S. Application Data

(63) Continuation of application No. PCT/KR2015/011583, filed on Oct. 30, 2015.

(30) Foreign Application Priority Data

Oct. 30, 2014  (KR) .................. 10-2014-0149552

(51) Int. Cl.
*H01J 49/42* (2006.01)
*G06N 99/00* (2019.01)
(Continued)

(52) U.S. Cl.
CPC ............ *H01J 49/424* (2013.01); *G06N 99/00* (2013.01); *H01J 3/40* (2013.01); *H01J 9/14* (2013.01); *G06N 99/002* (2013.01)

(58) Field of Classification Search
None
See application file for complete search history.

(56) References Cited

U.S. PATENT DOCUMENTS 5,248,883 A * 9/1993 Brewer .................. G04F 5/14
                                                          250/281
7,411,187 B2 * 8/2008 Monroe ............... G06N 99/002
                                                          250/207

(Continued)

OTHER PUBLICATIONS

Wilpers et al. "A monolithic array of three-dimensional ion traps fabricated with conventional semiconductor technology", nature nanotechnology, Jul. 2012.*

(Continued)

*Primary Examiner* — Michael J Logie
(74) *Attorney, Agent, or Firm* — Hauptman Ham, LLP

(57) ABSTRACT

An ion trap device is disclosed with a method of manufacturing thereof including a substrate, first and second RF electrode rails, first and second DC electrodes on either upper or lower side of substrate, and a laser penetration passage connected to ion trapping zone from outer side of the first or second side of substrate. The substrate includes ion trapping zone in space defined by first and second sides of substrate separated by a distance with reference to width direction of ion trap device. The first and second RF electrode rails are arranged in parallel longitudinally of ion trap device. The first RF electrode is arranged on upper side of first side, the second DC electrode is arranged on lower side of first side, the first DC electrode is arranged on upper side of second side, and the second RF electrode rail is arranged on lower side of second side.

4 Claims, 27 Drawing Sheets

(51) Int. Cl.
*H01J 3/40* (2006.01)
*H01J 9/14* (2006.01)

(56) References Cited

U.S. PATENT DOCUMENTS

| | | |
|---|---|---|
| 7,928,375 B1 | 4/2011 | Mangan et al. |
| 2005/0061767 A1 | 3/2005 | Pai et al. |
| 2006/0169882 A1 | 8/2006 | Pau et al. |
| 2007/0040113 A1* | 2/2007 | Monroe ............... G06N 99/002 250/290 |
| 2010/0084549 A1 | 4/2010 | Ermakov et al. |
| 2016/0027604 A1* | 1/2016 | Cho .................... H01J 49/0013 250/489 |
| 2016/0322188 A1* | 11/2016 | Youngner ................. H01J 3/38 |

OTHER PUBLICATIONS

See, Patrick et al., "Fabrication of a Monolithic Array of Three Dimensional Si-based Ion Traps", Journal of Microelectromechanical Systems, Jul. 3, 2013, pp. 1180-1189, vol. 22, No. 5.
International Search Report for PCT/KR2015/011583 dated Feb. 12, 2016.

* cited by examiner

MEMS-BASED 3D ION TRAPPING DEVICE FOR USING LASER PENETRATING ION TRAPPING STRUCTURE, AND METHOD FOR MANUFACTURING SAME

CROSS-REFERENCE TO RELATED APPLICATION

This application is a continuation of International Application No. PCT/KR2015/011583, filed Oct. 30, 2015, which claims priority to Korean Patent Application No. 10-2014-0149552, filed on Oct. 30, 2014. The entire disclosures of each of the above applications are incorporated herein by reference.

TECHNICAL FIELD

The present disclosure relates to a micro electro mechanical system (MEMS)-based three-dimensional (3D) ion trap device for using a laser that penetrates an ion trapping structure and a method of manufacturing the ion trap device.

BACKGROUND

The statements in this section merely provide background information related to the present disclosure and do not necessarily constitute prior art.

A quantum computer can greatly increase the processing speed compared to the conventional computing method, by using a quantum algorithm that is totally different from that for a conventional computer. Advances in the quantum computing technology caused the conventional Rivest Shamir Adleman (RSA)-based encryption system to be easily deciphered, and hence a quantum key distribution (QKD) system has been developed to replace the conventional encryption system, which has been already commercialized by several companies and in practical use.

The principal limitation of the current QKD system is that there exists a limit on the distance for a single time communication due to an attenuation of a single photon while propagating through an optical fiber. In order to overcome the shortcoming, signals need to be amplified by using a quantum repeater. An ion trap is most popular among the methods for realizing a quantum memory that is indispensable for manufacturing the quantum repeater.

Ion traps have a basic structure formed by four electrodes e1, e2, e3 and e4, as shown in FIG. 1A. When the electrodes e1 and e4 are grounded and a high voltage radio frequency (RF) signal is applied to the electrodes e2 and e3 to form an electric field (E) as shown in FIG. 1B, electrically charged particles are forced, on average, towards the center of the quadrangle (e.g., a square) defined by the electrodes e1, e2, e3 and e4. The potential generated by such average force is referred to as a ponderomotive potential.

FIG. 1C is a diagram showing the shape of a ponderomotive potential $\Phi pp$ formed by the electrodes e1, e2, e3 and e4, wherein the ponderomotive potential is irrelevant to the sign of a charged particle trapped by the electrodes e1, e2, e3 and e4. The potential continues to centrally attract the charged particle despite its tendency to depart from the z-axis (FIG. 1A), but the potential does not contribute to determining the location where the charged particle may be trapped along the z-axis. Therefore, in order to trap the electrically charged particle at the location as in FIG. 1A, a voltage is applied to satisfy the condition of V1>V2, instead of grounding the electrodes e1 and e4.

The ion trap can be manufactured by various methods. Among them the most popular one is a MEMS-based 3D ion trap manufacturing. Since the introduction of the concept of applying the ion trap to the quantum computer, MEMS-based planar ion trap chips or surface ion trap chips are manufactured by forming metal electrodes on a silicon substrate as shown in FIG. 2A, featuring ions trapped at a position as high as several tens to hundreds of micrometers above the ion trap device as shown in FIG. 2B. In contrast to this, a MEMS-based 3D ion trapping technology can generally increase the life of the ion by securing more potential depth than with the planar ion trap chip.

As shown in FIG. 3, the MEMS-based ion trap chip traps an ion by using an electric field formed by a high-voltage RF signal and a direct-current (DC) voltage in an ultra-high vacuum (UHV) environment. At this moment, a high voltage of up to several hundred volts is applied to an RF electrode. As opposed to a low-voltage RF signal which might be safely applied to the RF electrode, the high-voltage RF signal applied to the RF electrode has a high tendency to cause a breakdown to take place between the RF electrode and peripheral electrodes. For example, when a breakdown occurs between the RF electrode and a DC electrode, they are both damaged, disabling the ion trap chip.

A way to cope with this issue includes broadening a space between the RF electrode and the DC electrode to prevent a potential breakdown; however, this causes a degradation of the performance of the ion trap chip. Therefore, in order to increase the life of the trapped ion, a laser is used to decrease the kinetic energy of the ion to cool down the ion.

As an example of the limited ion trap chip for solving the breakdown issue so as to avoid affecting the performance of a conventional MEMS-based 3D ion trap chip, an ion trap chip is known to be dimensioned as illustrated in FIG. 3A wherein the number of electrodes is increased to control an ion in a precise and various manner or an interval between the electrodes is minimized to downsize the ion trap chip having electrodes formed by Au plating on both surfaces of the silicon substrate, so that the ion is trapped at the center portion of the silicon structure.

Therefore, an approachable range of the laser is limited to an area of passing a slot for injecting or loading the ion(s) as shown in FIG. 3B, and hence as the ion injecting slot in the ion trap device gets smaller, a laser scattering is likely to happen. For this reason, there is a limit in decreasing the size of the ion trap device. To cope with this problem, a separate path for the laser is needed to minimize the breakdown. To this end, a new process is required for providing a hole that allows a laser emitted in a first direction of the ion trap device to penetrate through the ion trap device to pass in a second direction in the ion trap device without damaging the ion trap chip or for manufacturing the ion trap chip with the hole formed therein.

DISCLOSURE

Technical Problem

Therefore, the present disclosure has been made in an effort to effectively resolving the above-mentioned deficiencies, and it is an object of the present invention to form a path of a laser that penetrates an ion trapping structure in order to prevent a problem caused by the laser scattering and to decrease the number of laser devices required for the 3D ion trapping so that the laser scattering is prevented while cooling the ion(s) by using the laser when capturing the ion.

SUMMARY

In accordance with some embodiments of the present disclosure, an ion trap device includes a substrate, a first RF electrode rail, a second RF electrode rail, at least one first DC electrode, at least one second DC electrode on either an upper side or a lower side of the substrate, and a laser penetration passage. The substrate includes an ion trapping zone in a space defined by a first side and a second side of the substrate separated by a predetermined distance with reference to a width direction of the ion trap device. The first RF electrode rail and the second RF electrode rail are arranged in parallel along a longitudinal direction of the ion trap device. The first RF electrode is arranged on an upper side of the first side, the at least one second DC electrode is arranged on a lower side of the first side, the at least one first DC electrode is arranged on an upper side of the second side, and the second RF electrode rail is arranged on a lower side of the second side. The laser penetration passage is connected to the ion trapping zone from outer side of the first side or the second side of the substrate.

In accordance with some embodiments of the present disclosure, a method of manufacturing an ion trap device, includes forming an electrode pattern including a first RF electrode rail, a second RF electrode rail, at least one first DC electrode, and at least one second DC electrode arranged with reference to a predetermined position of an ion trapping zone by depositing a conductive film on a semiconductor substrate, forming a plurality of processing holes on upper and lower sides of the semiconductor substrate at a position corresponding to the laser penetration passage in order to form the laser penetration passage that connects an outer side of the semiconductor substrate and the ion trapping zone in the semiconductor substrate, forming a through hole in the semiconductor substrate at a position corresponding to the ion trapping zone, and forming the ion trapping zone and the laser penetration passage along the processing holes and the through hole.

In accordance with some embodiments of the present disclosure, a method of manufacturing an ion trap device, includes forming a plurality of processing holes on upper and lower sides of a semiconductor substrate at a position corresponding to a laser penetration passage in order to form the laser penetration passage that connects an outer side of the semiconductor substrate and a predetermined ion trapping zone in the semiconductor substrate, forming the ion trapping zone and the laser penetration passage along the processing holes, forming an electrode pattern including a first RF electrode rail, a second RF electrode rail, at least one first DC electrode, and at least one second DC electrode arranged with reference to a predetermined position of the ion trapping zone by depositing a conductive film on the semiconductor substrate, and forming a through hole in the semiconductor substrate at a position corresponding to the ion trapping zone and forming the ion trapping zone along the through hole.

Advantageous Effects

According to the present disclosure as described above, by providing an ion trap device including a structure having a hole that allows a laser to approach in a direction other than a slot in a 3D ion trap, the problem of the limited size of the ion trap device to reduce an influence of the laser scattering in the conventional 3D ion trap chip design can be solved and the problem caused by the laser scattering in the ion trap can be suppressed.

DETAILED DESCRIPTION

Exemplary embodiments of the present invention are described in detail below with reference to the accompanying drawings.

Figure 1A:
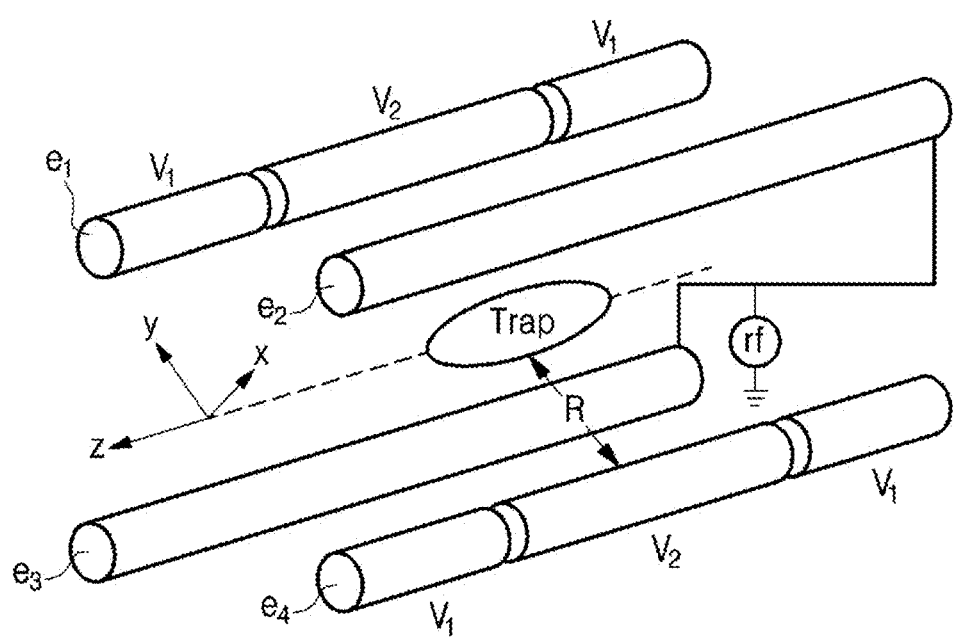
FIGS. 1A, 1B and 1C are perspective views of a structure for explaining the principle of the 3D trap.
Figure 1B:
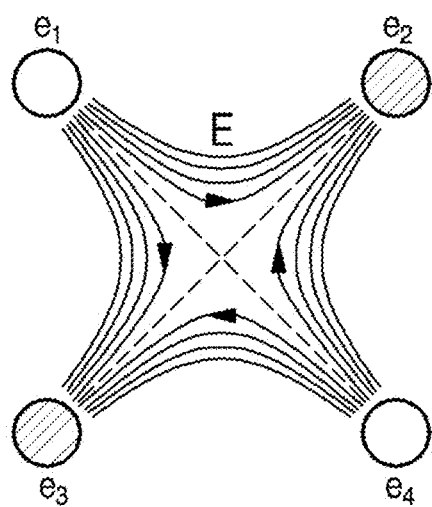
Figure 1C:
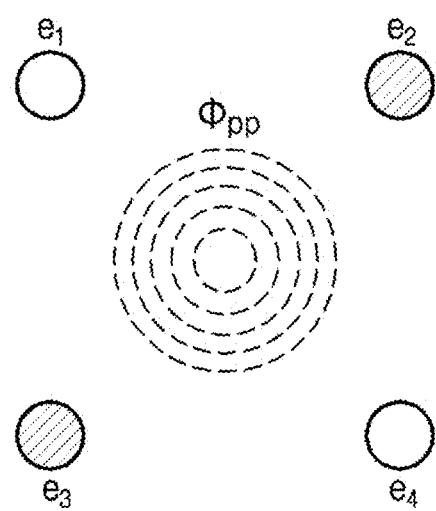
Figure 2A:
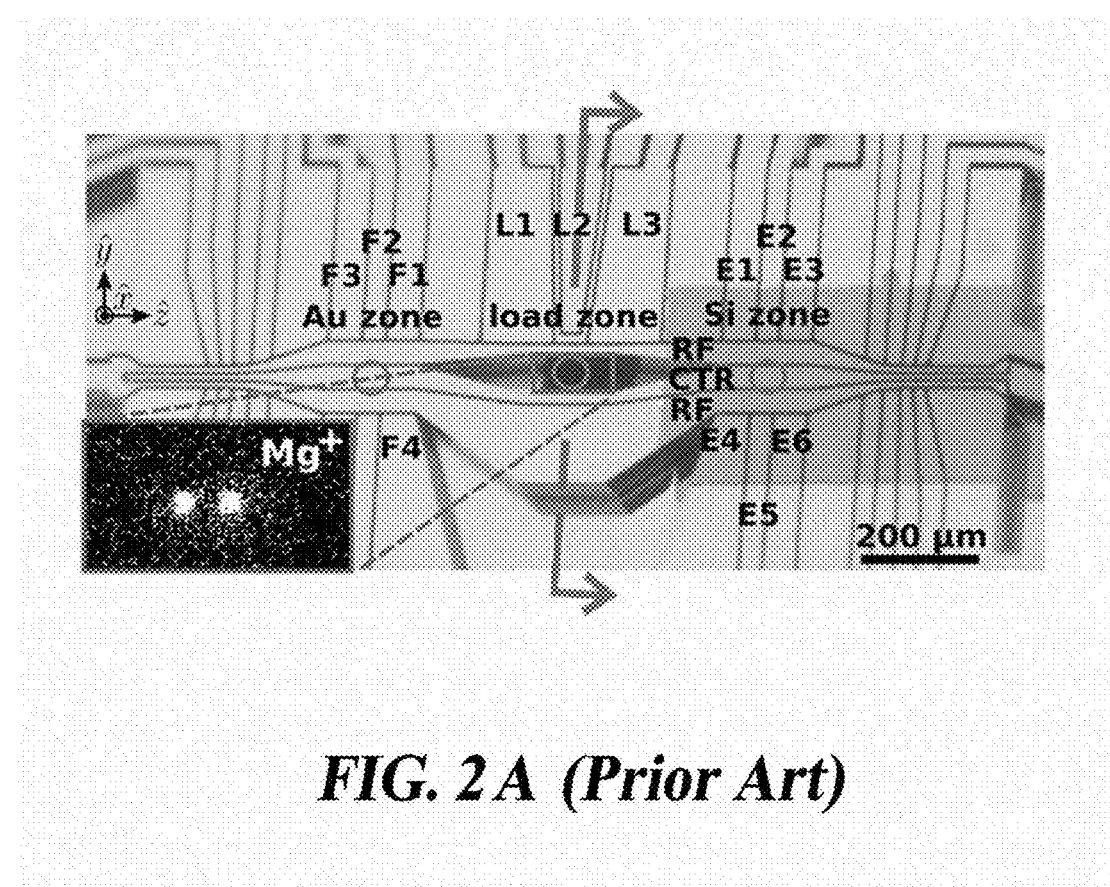
FIGS. 2A and 2B are exemplary diagrams of a 2D ion trap.
Figure 2B:
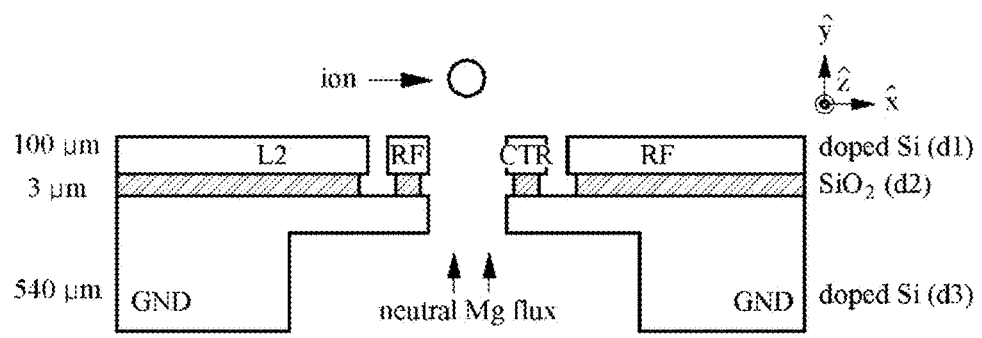
Figure 3A:
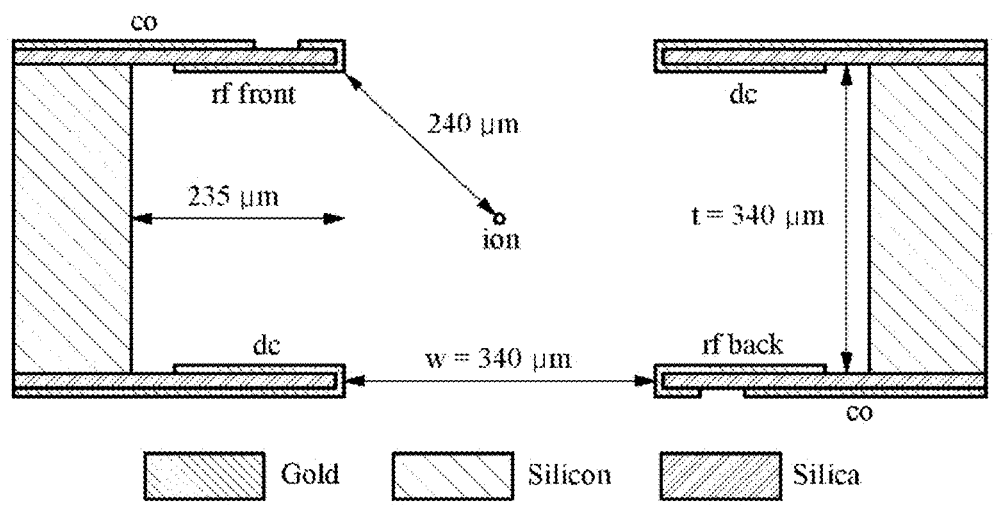
FIGS. 3A and 3B are exemplary diagrams of a 3D ion trap.
Figure 3B:
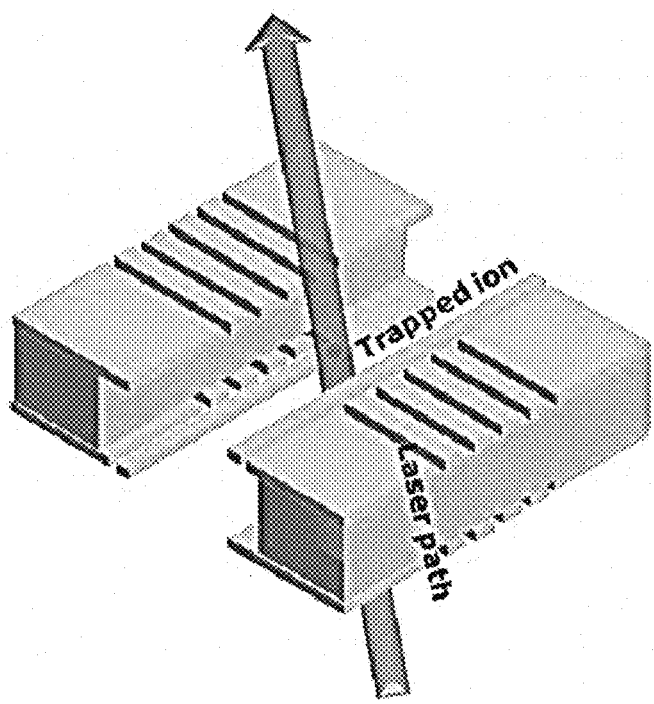
Figure 4:
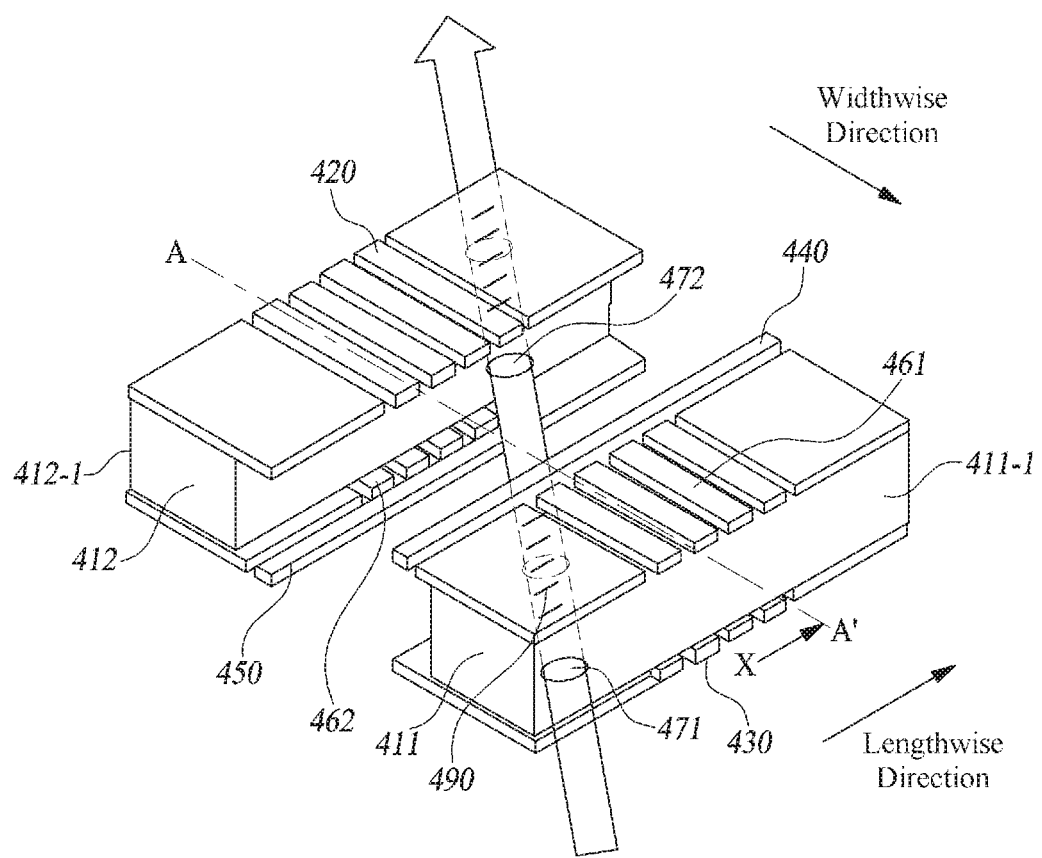
FIG. 4 is a perspective view of an ion trap device 400 according to at least one embodiment of the present invention.
Figure 5:
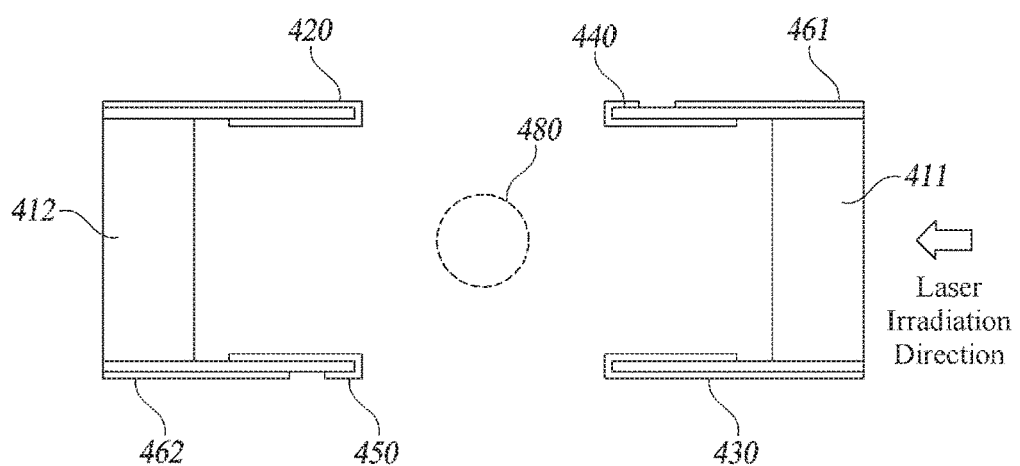
FIG. 5 is a cross-sectional view of the ion trap device cut along line A-A' in FIG. 4 as viewed in a direction X.

FIG. 4 is a perspective view of an ion trap device 400 according to at least one embodiment of the present invention, and FIG. 5 is a cross-sectional view of the ion trap device cut along line A-A in FIG. 4 as viewed in a direction X.

As shown in FIG. 4, the ion trap device 400 according to at least one embodiment of the present invention includes a semiconductor substrate 410, and at least one first DC electrode 420, at least one second DC electrode 430, a first RF electrode rail 440, a second RF electrode rail 450, and at least one side DC electrode 461, 462 formed over the semiconductor substrate 410

The semiconductor substrate 410 includes an ion trapping zone 480 in a space defined by a first side 411 and a second side 412 separated by a predetermined distance in the width direction of the ion trap device 400. The first RF electrode rail 440 is arranged on the upper side of the first side 411, and the at least one second DC electrode 430 is arranged on the lower side of the first side 411. The at least one first DC electrode 420 is arranged on the upper side of the second side 412, and the second RF electrode rail 450 is arranged on the lower side of the second side 412.

The first RF electrode rail 440 and the second RF electrode rail 450 are arranged in parallel in the longitudinal direction of the ion trap device 400.

As shown in FIG. 4, when the at least one first DC electrode 420 includes a plurality of first DC electrodes 420 and the at least one second DC electrode 430 includes a plurality of second DC electrodes 430, the plurality of first DC electrodes 420 and the plurality of second DC electrodes 430 are respectively arranged in parallel in the longitudinal direction of the ion trap device 400.

With respect to the first RF electrode rail 440 and the second RF electrode rail 450, one or more side DC electrodes 461 and 462 are respectively arranged at regular intervals on opposite sides of the ion trapping zone 480.

The semiconductor substrate 410 further includes a laser penetration passage 471, 472 that allows a laser emitted from an outer side 411-1 of the first side 411 of the semiconductor substrate 410 to pass the ion trapping zone 480 to an outer side 412-1 of the second side 412 of the semiconductor substrate 410. When the laser penetration passage 471, 472 is formed in a direction parallel to the width direction of the longitudinal direction of the semiconductor substrate 410, the laser penetration passage 471, 472 is hard to form, and hence the laser penetration passage 471, 472 is arranged in a direction between the width direction and the longitudinal direction of the ion trap device 400. As shown in FIGS. 4 and 5, the laser can be emitted in a direction that forms a plane with the width direction and the longitudinal direction; however, the present invention is not limited thereto.

A plurality of processing holes 490 is formed along an upper side position or a lower side position of the substrate corresponding to a position of the laser penetration passage 471, 472. The processing holes 490 can be formed according to the process of forming the laser penetration passage 471, 472.

The first and second DC electrodes 420 and 430, the first RF electrode rail 440 and the second RF electrode rail 450, and the DC electrode 461, 462 are respectively connected to connection pads (not shown) to be connected to a DC power source, an RF power source, and a GND. This is obvious to one of ordinary skill in the art, and hence a separate connection pad is omitted from drawing in FIGS. 4 and 5 and a description thereof is omitted accordingly.

Figure 6:
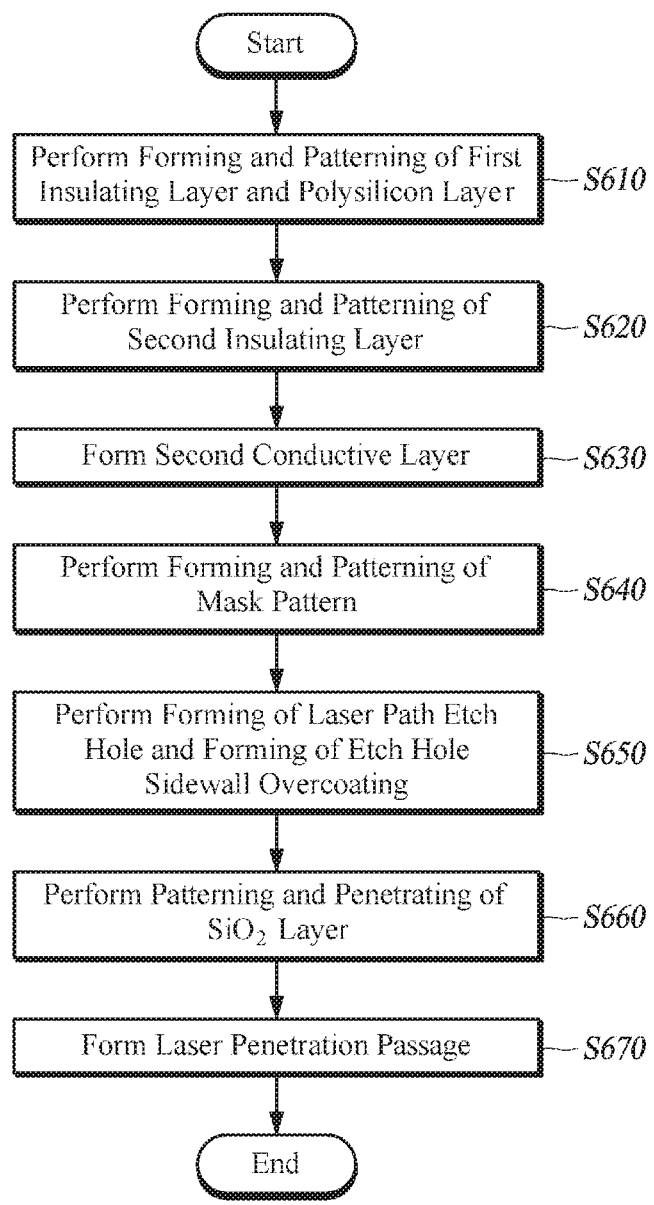
FIG. 6 is a flowchart showing a method of manufacturing an ion trap chip, according to a first embodiment of the present invention.

FIG. 6 is a flowchart showing a method of manufacturing an ion trap chip, according to a first embodiment of the present invention.

As shown in FIG. 6, the method of manufacturing the ion trap chip according to at least one embodiment of the present invention includes a step of forming and patterning the a insulating layer and a polysilicon layer (Step S610), a step of forming and patterning a second insulating layer (Step S620), a step of forming a second conductive film (Step S630), a step of patterning an electrode pattern and a laser path upper side (Step S640), a step of forming a laser path etch hole and an etch hole sidewall overcoating (Step S650), a step of patterning and penetrating an $SiO_2$ layer (Step S660), and a step of forming a laser penetration passage (Step S670).

Figure 7:
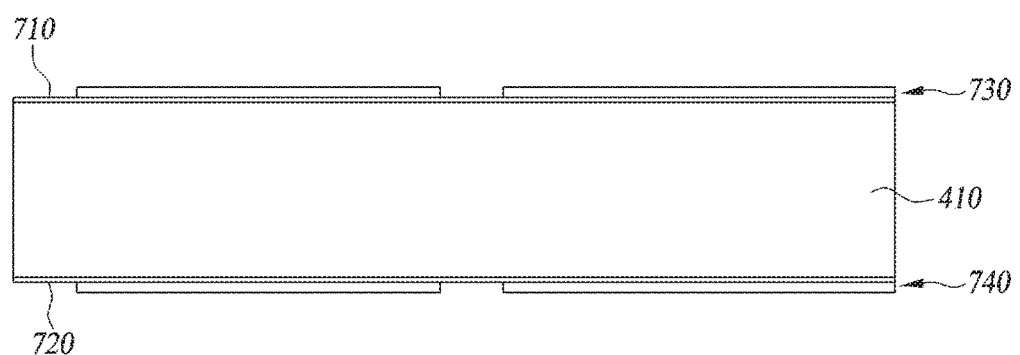
FIG. 7 is a cross-sectional view of the ion trap chip after performing a step of forming and patterning a first insulating layer and a polysilicon layer (Step S610).
Figure 8:
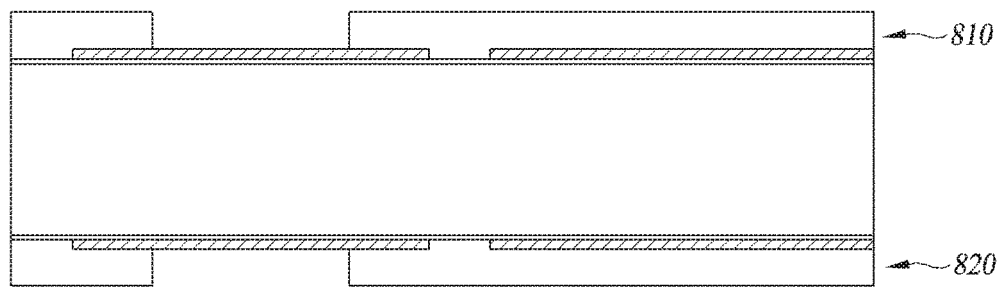
FIG. 8 is a cross-sectional view of the ion trap chip after performing a step of forming and patterning a second insulating layer (Step S620).
Figure 9:
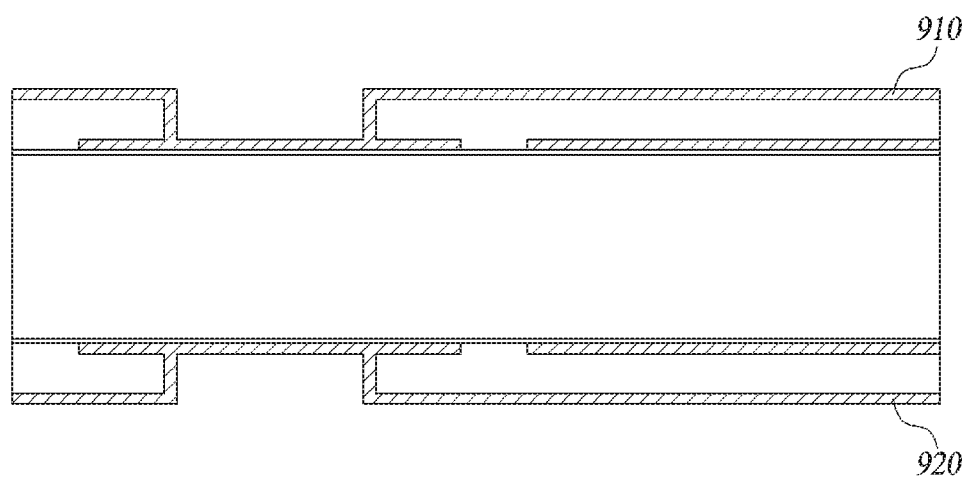
FIG. 9 is a cross-sectional view of the ion trap chip after performing a step of forming a second conductive film (Step S630).
Figure 10:
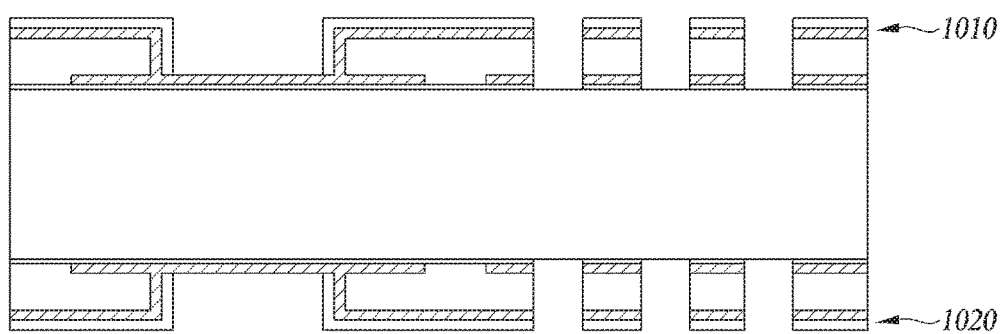
FIG. 10 is a cross-sectional view of the ion trap chip after performing a step of forming and patterning a mask pattern (Step S640).
Figure 11:
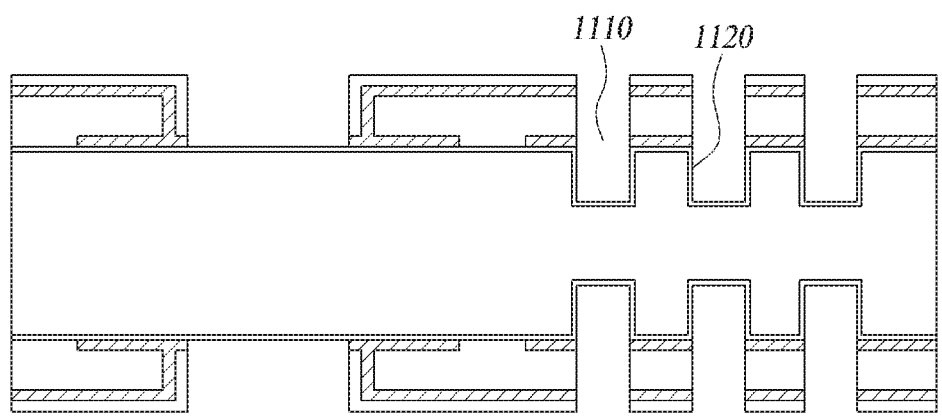
FIG. 11 is a cross-sectional view of the ion trap chip after performing a step of forming a laser path etch hole and an etch hole sidewall overcoating (Step S650).
Figure 12:
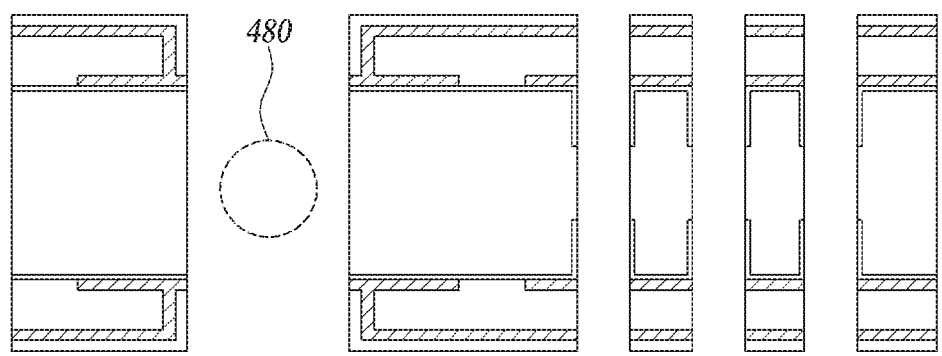
FIG. 12 is a cross-sectional view of the ion trap chip after performing a step of patterning and penetrating an $SiO_2$ layer (Step S660).
Figure 13:
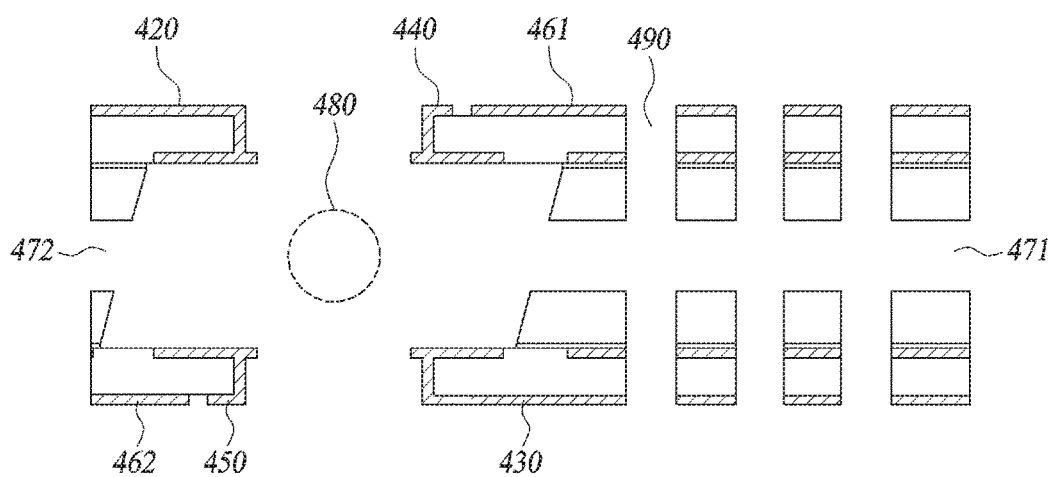
FIG. 13 is a cross-sectional view of the ion trap chip 400 after performing a step of forming a laser penetration passage (Step S670).

FIG. 7 is a cross-sectional view of the ion trap chip after performing a step of forming and patterning the first insulating layer and the polysilicon layer (Step S610), FIG. 8 is a cross-sectional view of the ion trap chip after performing a step of forming and patterning the second insulating layer (Step S620), FIG. 9 is a cross-sectional view of the ion trap chip after performing a step of forming the second conductive film (Step S630), FIG. 10 is a cross-sectional view of the ion trap chip after performing a step of forming and patterning the mask pattern (Step S640), FIG. 11 is a cross-sectional view of the ion trap chip after performing a step of forming the laser path etch hole and the etch hole sidewall overcoating (Step S650), FIG. 12 is a cross-sectional view of the ion trap chip after performing a step of patterning and penetrating the $SiO_2$ layer (Step S660), and FIG. 13 is a cross-sectional view of the ion trap chip 400 after performing a step of forming the laser penetration passage (Step S670).

As shown in FIG. 7, in the step of forming and patterning the first insulating layer and the first conductive film (Step S610), an $SiO_2$ layer is formed by wet oxidation as first insulating layers 710 and 720 on the top surface and the bottom surface of the semiconductor substrate 410, respectively, to insulate the semiconductor substrate 410. Thereafter, a polysilicon (Poly-Si) layer to be used as an internal electrode is deposited by the low pressure chemical vapor deposition (LPCVD) method and doped with $POCl_3$ to form first conductive films 730 and 740. After forming the first conductive films 730 and 740, the first conductive films 730 and 740 are patterned on the top surface and the bottom surface by the plasma dry etching method to form a portion to be used as an internal electrode at the first and second DC electrodes 420 and 430) and the first and second RF electrodes 440 and 450.

As shown in FIG. 8, in the step of forming and patterning the second insulating layer (Step S620), tetraethyl orthosilicate (TEOS) is deposited as second insulating layers 810 and 820 on the top surface and the bottom surface, respectively, by the plasma enhanced chemical vapor deposition (PECVD), and areas corresponding to the ion trapping zone 480 and an electrode pattern are patterned on the second insulating layers 810 and 820 to form a basis for a side electrode portion and an external electrode portion of the DC electrodes 420 and 430 and the RF electrodes 440 and 450.

As shown in FIG. 9, in the step of forming the second conductive film (Step S630), the polysilicon layers are deposited on the top surface and the bottom surface, respectively, by the LPCVD to form the side electrode portion and the external electrode portion of the DC electrodes 420 and 430 and the RF electrodes 440 and 450, and doped with $POCl_3$ to form second conductive films 910 and 920.

As shown in FIG. 10, in the step of patterning the electrode pattern and the laser path upper side (Step S640), the TEOS layers are deposited on the top surface and the bottom surface, respectively, by the PECVD, and the TEOS corresponding to the ion trapping zone 480 and the TEOS of an area other than the side electrode portion and the external electrode portion of the DC electrodes 420 and 430 and the RF electrodes 440 and 450 is removed using a hard mask by plasma dry etching to form a mask pattern. After forming the mask pattern, the second conductive films 910 and 920 are patterned by plasma dry etching in a form of the external electrode portions of the DC electrodes 420 and 430 and the RF electrodes 440 and 450 along the mask pattern, and the second insulating layers 810 and 920 and the first conductive films 730 and 740 on the top surface and the bottom surface are patterned by the plasm dry etching.

As shown in FIG. 11, in the step of forming the laser path etch hole and the etch hole sidewall overcoating (Step S650), the first conductive films 730 and 740 corresponding to the ion trapping zone 480 are removed by the plasma dry etching, an etch hole 1110 of a predetermined depth is patterned by the plasma dry etching on the top surface and the bottom surface of the semiconductor substrate 410 at regular intervals along the laser path by using the deep reactive ion etching (DRIE) process, and thereafter an $SiO_2$ layer 1120 is formed by the wet oxidation on the etch hole to protect sidewalls of the etch hole.

As shown in FIG. 12, $SiO_2$ layer in the step of patterning and penetrating (Step S660), the $SiO_2$ layer of an area other than the ion trapping zone 480 and the sidewalls of the etch hole is removed by the plasma dry etching, and thereafter the DRIE process is performed on the corresponding area to penetrate through the semiconductor substrate 410.

As shown in FIG. 13, in the step of forming the laser penetration passage (Step S670), an area of the semiconductor substrate 410 exposed by the patterning is removed according to the 111 plane of the silicon that constitutes the semiconductor substrate 410 by a Si wet etch (SBM process) using the crystal plane characteristics of the semiconductor substrate 410 to form the laser penetration passage to the ion trapping zone 480 in the processing holes 490, the $SiO_2$ wet etch is performed on the area to the ion trapping zone 480 in the laser penetration passage 471, 472 to remove the $SiO_2$ layer 1120 of the corresponding area, mask patterns 1010 and 1020 for etching the substrate formed on the top surface and the bottom surface are removed by the TEOS wet etch process, the conductive film for separating the first RF electrode rail 440 from the side DC electrode 461 is removed, and the conductive film for separating the second RF electrode rail 450 from the side DC electrode 462) is removed.

Figure 14:
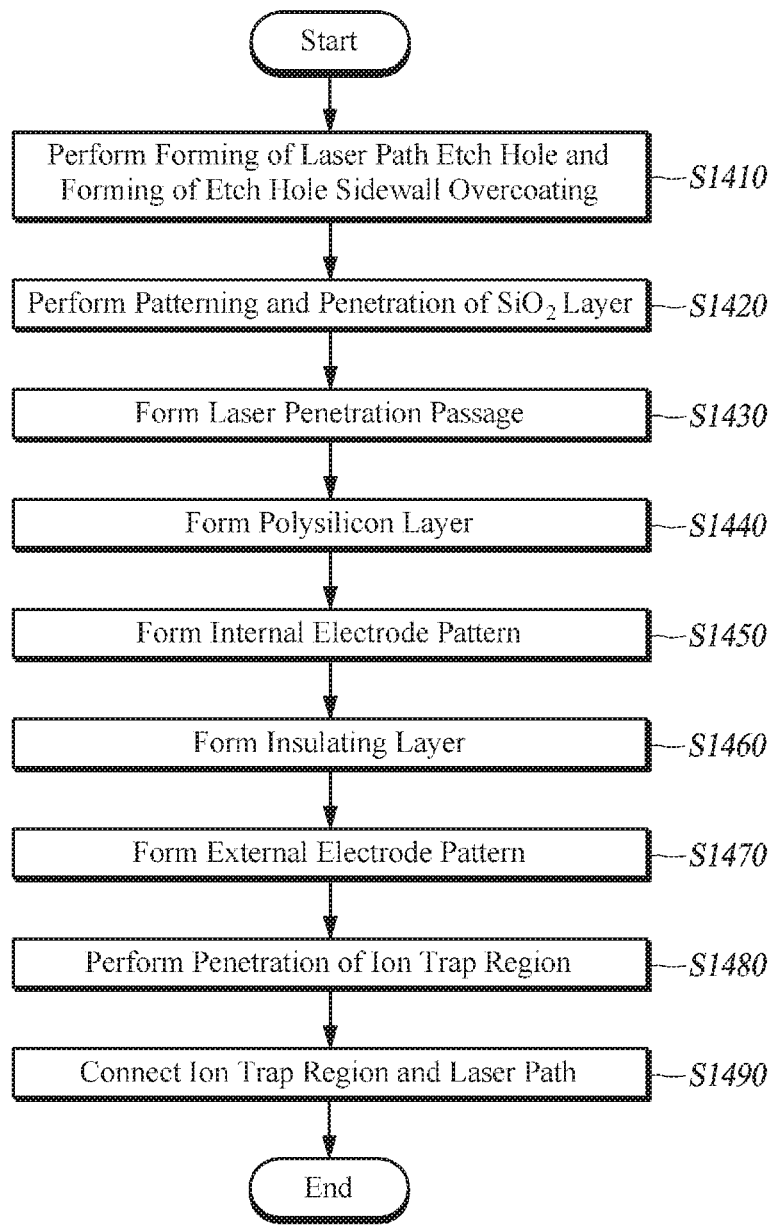
FIG. 14 is a flowchart showing a method of manufacturing an ion trap chip according to a second embodiment of the present invention.

FIG. 14 is a flowchart showing a method of manufacturing an ion trap chip according to a second embodiment of the present invention.

As shown in FIG. 14, the method of manufacturing the ion trap chip according to the second embodiment of the present invention includes a step of forming a laser path etch hole and an etch hole sidewall overcoating (Step S1410), a step of patterning and penetrating an $SiO_2$ layer (Step S1420), a step of forming a laser penetration passage (Step S1430), a step of forming a polysilicon layer (Step S1440), a step of forming an internal electrode pattern (Step S1450), a step of forming an insulating layer (Step S1460), a step of forming an external electrode pattern (Step S1470), a step of penetrating an ion trapping zone (Step S1480), and a step of connecting the ion trapping zone and the laser penetration passage (Step S1490).

Figure 15:
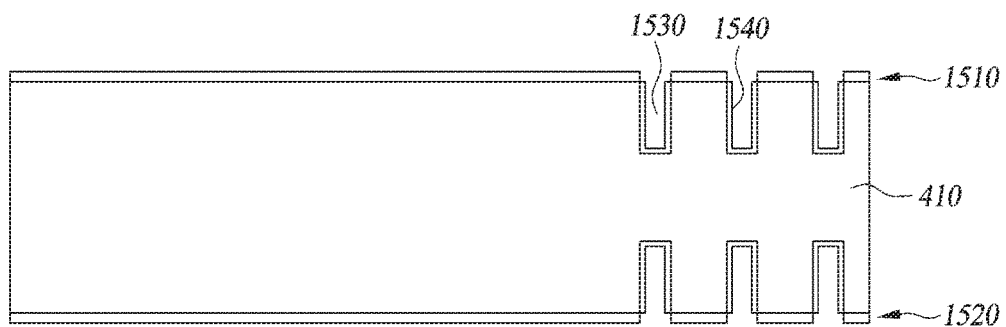
FIG. 15 is a cross-sectional view of the ion trap chip after performing a step of forming a laser path etch hole and an etch hole sidewall overcoating (Step S1410).
Figure 16:
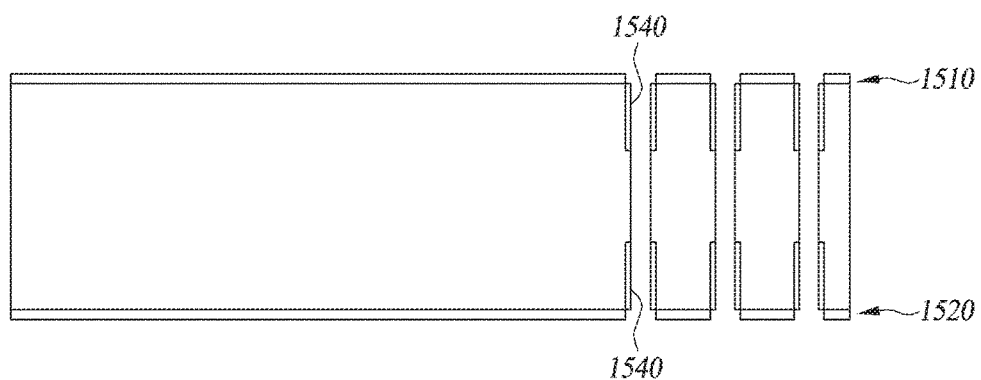
FIG. 16 is a cross-sectional view of the ion trap chip after performing a step of patterning and penetrating an $SiO_2$ layer (Step S1420).
Figure 17:
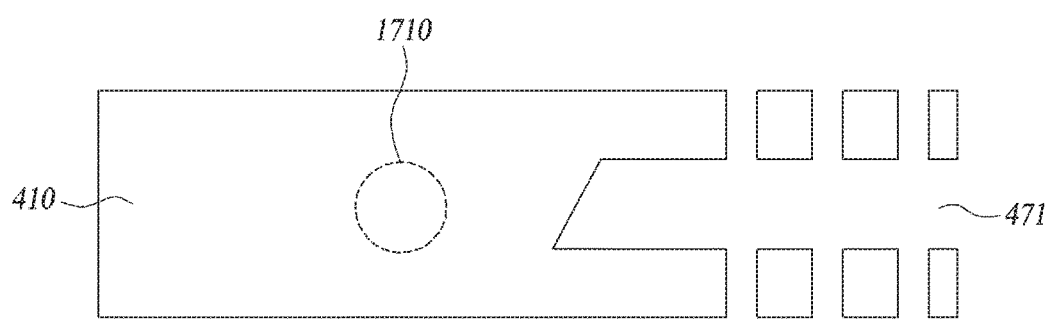
FIG. 17 is a cross-sectional view of the ion trap chip after performing a step of forming a laser penetration passage (Step S1430).
Figure 18:
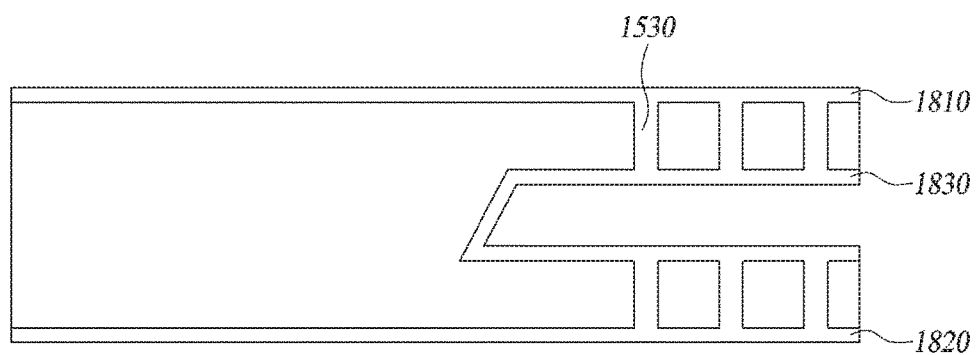
FIG. 18 is a cross-sectional view of the ion trap chip after performing a step of forming a polysilicon layer (Step S1440).
Figure 19:
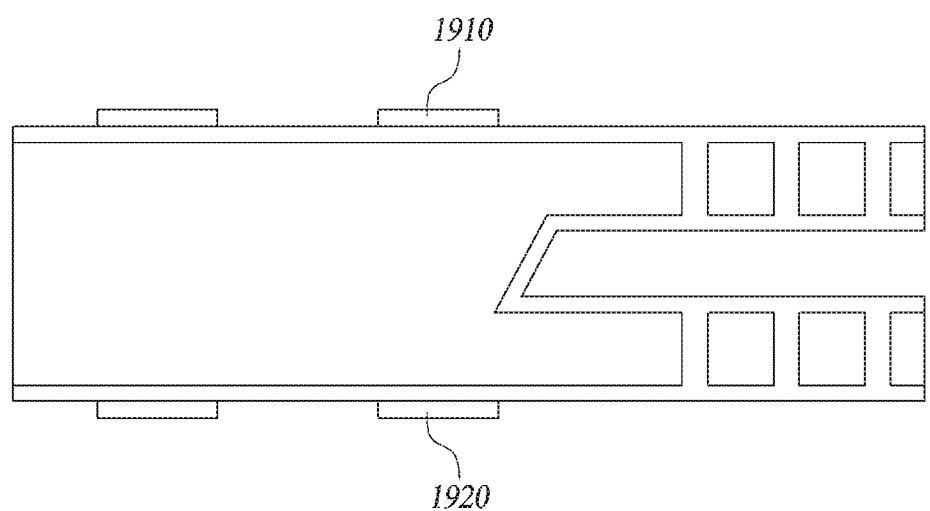
FIG. 19 is a cross-sectional view of the ion trap chip after performing a step of forming an internal electrode pattern (Step S1450).
Figure 20:
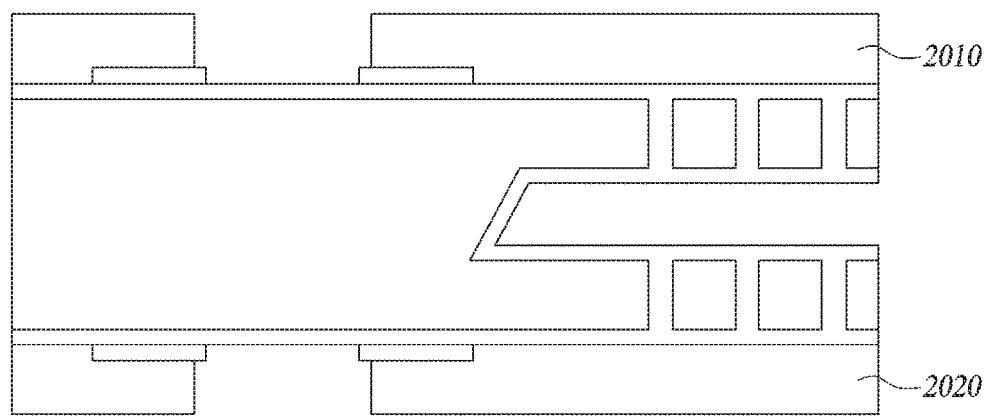
FIG. 20 is a cross-sectional view of the ion trap chip after performing a step of forming an insulating layer (Step S1460).
Figure 21:
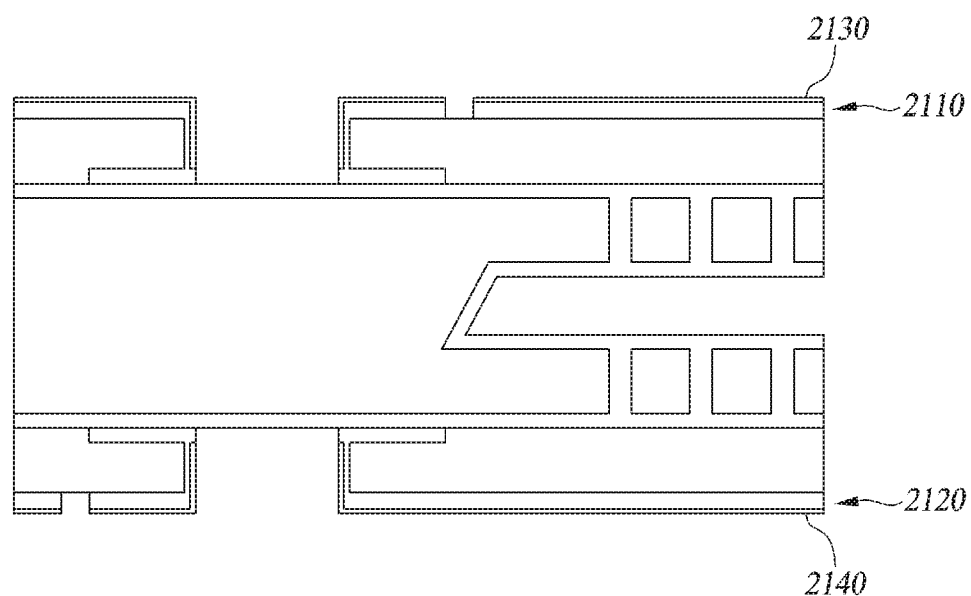
FIG. 21 is a cross-sectional view of the ion trap chip 400 after performing a step of forming an external electrode pattern (Step S1470).
Figure 22:
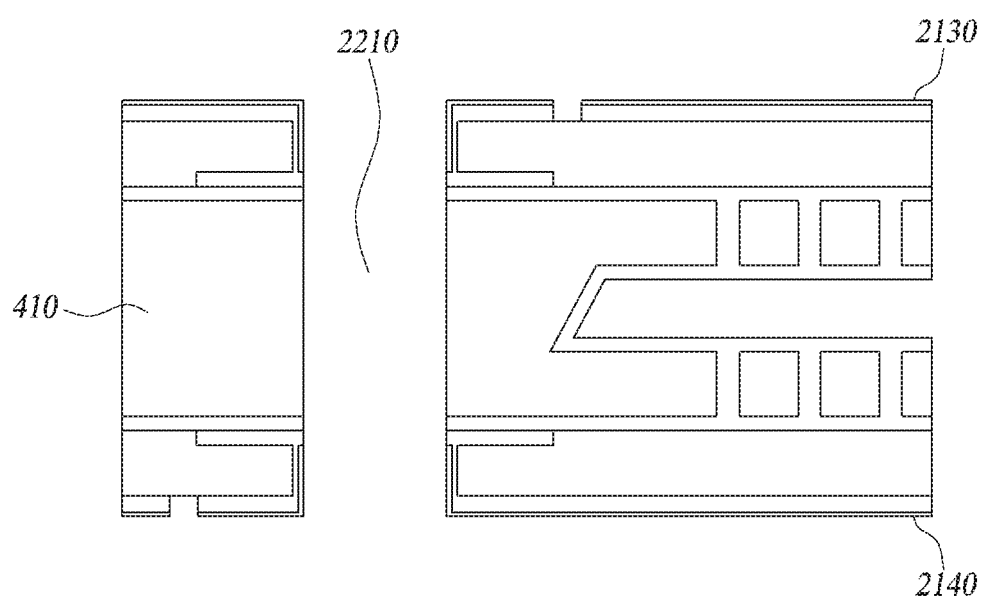
FIG. 22 is a cross-sectional view of the ion trap chip 400 after performing a step of penetrating an ion trapping zone (Step S1480).
Figure 23:
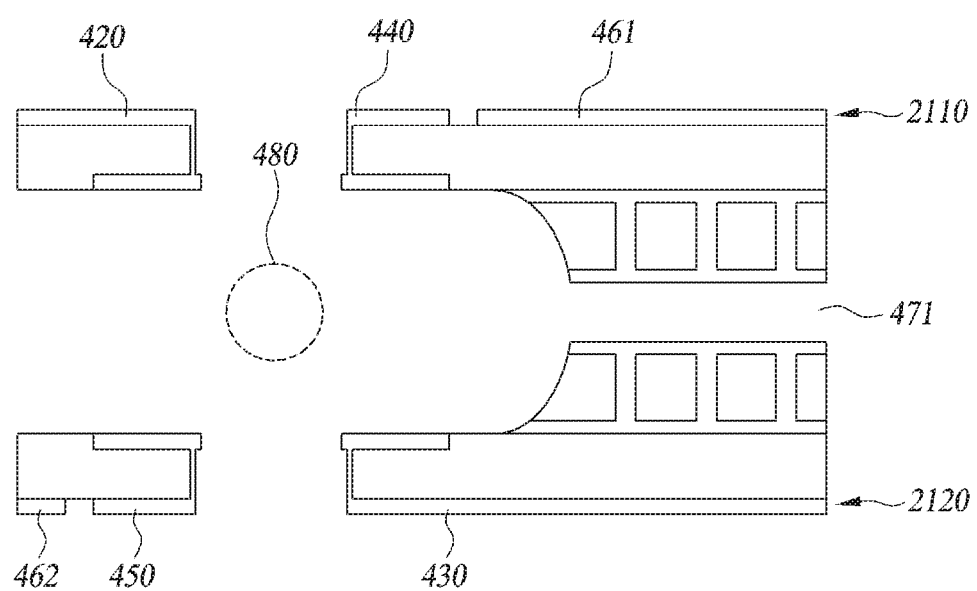
FIG. 23 is a cross-sectional view of the ion trap chip 400 after performing a step of connecting the ion trapping zone and the laser path (Step S1490).

FIG. 15 is a cross-sectional view of the ion trap chip after performing a step of forming the laser path etch hole and the etch hole sidewall overcoating (Step S1410), FIG. 16 is a cross-sectional view of the ion trap chip after performing a step of patterning the $SiO_2$ layer and the penetrating process (Step S1420), FIG. 17 is a cross-sectional view of the ion trap chip after performing a step of forming the laser penetration passage (Step S1430), FIG. 18 is a cross-sectional view of the ion trap chip after performing a step of forming the polysilicon layer (Step S1440), FIG. 19 is a cross-sectional view of the ion trap chip after performing a step of forming the internal electrode pattern (Step S1450), FIG. 20 is a cross-sectional view of the ion trap chip after performing a step of forming the insulating layer (Step S1460), FIG. 21 is a cross-sectional view of the ion trap chip 400 after performing a step of forming the external electrode pattern (Step S1470), FIG. 22 is a cross-sectional view of the ion trap chip 400 after performing a step of penetrating the ion trapping zone (Step S1480), and FIG. 23 is a cross-sectional view of the ion trap chip 400 after performing a step of connecting the ion trapping zone and the laser path (Step S1490).

As shown in FIG. 15, in the step of forming the laser path etch hole and the etch hole sidewall overcoating (Step S1410), the TEOS is deposited by the PECVD, a patterning is performed on an upper-side area of the semiconductor substrate 410 corresponding to the laser path at regular intervals by the plasm dry etching to form mask patterns 1510 and 1520 for etching the substrate on the top surface and the bottom surface.

Thereafter, after patterning an etch hole 1530 of a predetermined depth is patterned by plasma dry etching at regular intervals on the top surface and the bottom surface of the semiconductor substrate 410 corresponding to the laser path by the DRIE process, an $SiO_2$ layer 1540 is formed on the etch hole 1530 by the wet oxidation to protect the sidewalls of the etch hole.

As shown in FIG. 16, in the step of patterning and penetrating the $SiO_2$ layer (Step S1420), the $SiO_2$ layer of an area other than the sidewalls of the etch hole is etched by the plasma dry etching, and thereafter the semiconductor substrate 410 is penetrated by performing the DRIE process on the corresponding area.

As shown in FIG. 17, in the step of forming the laser penetration passage (Step S1430), the area of the semiconductor substrate 410 that is exposed by patterning by the Si wet etch (SBM process) using the crystal plane characteristics of the semiconductor substrate 410 is removed according to the 111 plane of the silicon that constitutes the semiconductor substrate 410 to form the laser penetration passage 471, 472 reaching the area corresponding to the laser processing holes 490 and the ion trapping zone 480, the $SiO_2$ wet etch process is performed on the area from the laser penetration passage 471, 472 to the ion trapping zone 480 to remove the $SiO_2$ layer 1540 of the corresponding area, and the mask patterns 1510 and 1520 for etching the substrate on the top surface and the bottom surface are removed by the TEOS wet etch process.

As shown in FIG. 18, in the step of forming the polysilicon layer (Step S1440), the etch hole is filled with the polysilicon by a polysilicon deposition using the LPCVD on the top surface and the bottom surface of the semiconductor substrate 410, flat polysilicon layers 1810 and 1820 for the electrode processing are formed, and the polysilicon layers 1810 and 1820 are formed on an inner wall 1830 of the laser penetration passage 471, 472.

As shown in FIG. 19, in the step of forming the internal electrode pattern (Step S1450), a metal film is deposited by sputtering on the top surface and the bottom surface of the semiconductor substrate 410 and patterned by the plasma dry etching to form internal electrodes 1910 and 1920. Materials that are usable in a high vacuum environment, such as aluminum and gold, can be used as the material for the metal film; however, the present invention is not limited to this. The metal film can be formed by depositing material such as aluminum by the sputtering or the evaporation; however, the present invention is not limited to this.

As shown in FIG. 20, in the step of forming the insulating layer (Step S1460), the TEOS is deposited as the insulating layer on the top surface and the bottom surface, and the TEOS corresponding to the ion trapping zone 480 is patterned by the plasma dry etching to form first insulating layers 2010 and 2020.

As shown in FIG. 21, in the step of forming the external electrode pattern (Step S1470), metal films 2110 and 2120 and TEOS 2130 and 2140 are deposited by the sputtering to form the external electrode portions of the DC electrodes 420 and 430 and the RF electrodes 440 and 450 on the top surface and the bottom surface, and the area corresponding to the external electrode portions is patterned by the plasma dry etching.

As shown in FIG. 22, in the step of penetrating the ion trapping zone (Step S1480), an anisotropic DRIE process is performed on the corresponding area of the semiconductor substrate 410 where the ion trapping zone 480 is located, to penetrate the semiconductor substrate 410.

As shown in FIG. 23, in the step of connecting the ion trapping zone and the laser penetration passage (Step S1490), an undercut (a portion cut inside the ion trapping zone) is secured for a slot portion 2210 that has been penetrated corresponding to the ion trapping zone 480 in FIG. 22 by the isotropic DRIE process to achieve a sufficient area for the ion trapping zone 480, to form the ion trapping zone 480, and the TEOS layers 2130 and 2140 of the side electrode portions and the external electrode portions of the DC electrodes 420 and 430 and the RF electrodes 440 and 450 are removed by the SiO₂ wet etch process. In the step of forming the ion trapping zone 480, the isotropic DRIE process is performed to secure the undercut of a sufficient size such that the internal electrodes 1910 and 1920 do not contact the area of the semiconductor substrate 410.

Although exemplary embodiments of the present disclosure have been described for illustrative purposes, those skilled in the art will appreciate that various modifications, additions and substitutions are possible, without departing from the idea and scope of the claimed invention. Specific terms used in this disclosure and drawings are used for illustrative purposes and not to be considered as limitations of the present disclosure. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

INDUSTRIAL APPLICABILITY

As described above, the present disclosure is highly useful in solving the problem of the limited size of the ion trap device to reduce an influence of the laser scattering in the conventional 3D ion trap chip design and suppressing the problem caused by the laser scattering in the ion trap.

The invention claimed is:
1. An ion trap device, comprising:
   a substrate;
   a first RF electrode rail, a second RF electrode rail, at least one first DC electrode, and at least one second DC electrode on either an upper side or a lower side of the substrate, wherein
      the substrate includes an ion trapping zone in a space defined by a first side and a second side of the substrate separated by a predetermined distance with reference to a width direction of the ion trap device,
      the first RF electrode rail and the second RF electrode rail are arranged in parallel along a longitudinal direction of the ion trap device, and
      the first RF electrode is arranged on an upper side of the first side, the at least one second DC electrode is arranged on a lower side of the first side, the at least one first DC electrode is arranged on an upper side of the second side, and the second RF electrode rail is arranged on a lower side of the second side; and
   a laser penetration passage formed to pass a laser and be arranged in a direction, which set at a predetermined angle, between the width direction and the longitudinal direction, wherein the laser penetration passage is connected to
      a first inner hole formed in the first side of the substrate, the ion trapping zone, and
      a second inner hole formed in the second side of the substrate, and
      the laser penetration passage is configured to guide the laser to pass through the first inner hole and the second inner hole.
2. The ion trap device according to claim 1, wherein the at least one first DC electrode includes a plurality of first DC electrodes,
   the at least one second DC electrode includes a plurality of second DC electrodes, and
   the plurality of first DC electrodes and the plurality of second DC electrodes are respectively arranged in parallel along the longitudinal direction.
3. The ion trap device according to claim 1, further comprising a plurality of processing holes on the upper side or the lower side of the substrate corresponding to a position of the laser penetration passage.
4. The ion trap device according to claim 1, further comprising at least one side DC electrode on each of opposite sides of the space with respect to the first RF electrode rail and the second electrode rail.

* * * * *